United States Patent Office 3,766,093
Patented Oct. 16, 1973

3,766,093
TREATMENT OF ORGANIC CATION-
CONTAINING ZEOLITES
Pochen Chu, Woodbury, N.J., assignor to
Mobil Oil Corporation
No Drawing. Filed Jan. 7, 1972, Ser. No. 216,288
Int. Cl. B01j 11/40
U.S. Cl. 252—455 Z    24 Claims

ABSTRACT OF THE DISCLOSURE

A method of removing the organic cation from an organic cation-containing zeolite which comprises contacting the said zeolite with a solution of a compound which has a standard oxidation potential of at least 0.25 volt.

BACKGROUND OF THE INVENTION

Field of the invention

This invention is concerned with the removal of organic cations from organic cation-containing molecular sieves or zeolites. More specifically, this invention is directed to a chemical treatment of organic cation-containing zeolites to facilitate removal of the organic cation from the zeolite and to render it more suitable for subsequent ion exchange.

Discussion of the prior art

Molecular sieves or zeolites have, for some time, been known to be crystalline and to have a rigid three-dimensional structure wherein the pores of the material are uniform. These materials, especially when ion exchanged, are useful in the field of catalysis, especially cracking and hydrocracking. Certain zeolites function desirably as shape selective catalysts. Zeolites are generally useful for alkylation, polymerization (depending upon pore size of the molecular sieve), isomerization of aliphatics and aromatics, dealkylation and reforming. More recently, molecular sieves have been prepared by including in the reaction mixture an organic cation. A typical type of organic cation is a quaternary ammonium cation, such as tetramethylammonium. It is supplied to the reaction mixture in the form of a salt such as tetramethylammonium chloride or tetramethylammonium sulfate. Additionally, it can be supplied to the reaction mixture in alkaline form as tetramethylammonium hydroxide. It has become desirable to convert the as synthesized form of these organic cation-containing zeolites to remove the organic cation and through base exchange and calcination to convert the same to a more highly catalytically active form. Heretofore, the organic cation has been removed by subjecting the zeolite as synthesized to an elevated temperature, such treatment being referred to as precalcination. Thereafter, the zeolite is treated in accordance with known techniques to convert it to the desired form through base exchange and final calcination.

Unfortunately, the precalcination procedure heretofore employed has required high temperatures which are not generally beneficial to the crystallinity of the zeolite material. Additionally, such high temperature precalcination, at temperatures ordinarily between 700 and 1200° F., adds to the cost of converting the organic cation-containing zeolite to a more preferable catalytically-active form. It has thus become desirable to provide a simple chemical means, which can be accomplished at little expense, to remove the organic cation from the molecular sieve and to preserve the crystallinity thereof. Along with the desirability of providing an innocuous method of removing the organic cation, it has been desirable to provide an improved catalytically active form of the molecular sieve by virtue of the removal of the organic cation through a simple, inexpensive chemical treatment.

SUMMARY OF THE INVENTION

Broadly, this invention contemplates a method of removing the organic species from an organic cation-containing zeolite which comprises contacting the said zeolite with a solution of a compound, which has a standard oxidation potential of at least 0.25 volt.

DISCUSSION OF PREFERRED EMBODIMENTS

It has now been found, in accordance with this invention, that the organic species of organic cation-containing zeolites can be removed by a simple treatment with a certain class of compounds in solution. Specifically, it has been found that by treating organic cation-containing zeolites with a solution containing a soluble compound which has a standard oxidation potential of at least 0.25 volt that the organic species not only can be removed, but the resultant form of the zeolite, when ion exchanged, is superior to that form which would be obtained if the organic species were removed by the previously known precalcination procedure. Generally speaking, the organic cation is removed by contact of the zeolite with a solution of a soluble compound, which has a standard oxidation potential of at least 0.25 volt. Preferably, the oxidation potential of such compound is at least 0.5 volt and between 0.5 and 2.00 volt. Suitable compounds having such an oxidation potential include the chlorates ($ClO_3^-$), the hypochlorites ($OCl^-$), the permanganates ($MnO_4^-$), the dichromates ($Cr_2O_7^{--}$) and hydrogen peroxide ($H_2O_2$). Such compounds have the following respective standard oxidation potentials: .63 volt, .89 volt, 1.23 volt, 1.33 volt and 1.77 volt. Compounds having an oxidation potential greater than 2.00 include the peroxysulfate and ozone. The aforementioned compounds can be in association with various types of cations employed in the treating solution. For instance, the compound can be in the form of a metal salt typified by an alkali metal salt such as the sodium or potassium salt. Additionally, the compound can be in the form of an ammonium salt, the sole criterion being that the oxidation potential of the compound be at least 0.25 volt and preferably between .5 and 2.00 volt. Compounds which have an excessively high oxidation potential are undesirable as they may cause some damage to the zeolite structure itself.

The compound utilized, in the process of the present invention, having an oxidation potential of at least 0.25 volt, in generally employed, in its solution form. The solvent for the compound can be any of a wide variety, particularly those solvents having at least a minor degree of polarity. Particularly contemplated solvents include water, alcohols, ketones, acids, aldehydes, dimethylsulfoxide and dimethylformamide. Additionally, materials such as carbon tetrachloride and carbon disulfide can be used as solvents. Of the foregoing, water and alcohol are the most desirable because of their availability, inexpensiveness and their exceptional solvent properties for most of the compounds contemplated for use in the present invention.

The concentration of the oxidation compound in the solution is not particularly critical. Naturally, if an extremely dilute solution of the oxidation agent is employed, a longer contact time may be needed. Conversely, if the solution is highly concentrated, the contact time of the solution with the zeolite may be relatively short. Generally speaking, the concentration of the agent in solution is between 0.1 percent and 30 percent, by weight, and preferably between 1 percent and 15 percent, by weight. The contact time of the solution with the zeolite generally ranges between 0.5 hour and 72 hours and preferably between 4 hours and 16 hours, with time being an inverse function of concentration.

The contact of the solution with the zeolite is generally effected at elevated temperatures which temperatures are in the range of about 100 to about 500° F. and preferably between about 250 and about 350° F. Temperatures below about 100° F. generally are insufficient to permit the oxidizing agent to have sufficient effect upon the organic cation of the zeolite to accomplish the desired degree of removal of the cation from the zeolite. On the other hand, if the temperature exceeds about 500° F., especially for extended periods of time, some adverse effect upon the zeolite may occur. If high temperatures are to be utilized during the period of contact, it is desirable that pressure vessels be employed to maintain the solution in the liquid phase. The time of contact should also be so regulated that the molecular sieve is not harmed by being subjected to high temperatures for an extensive period of time.

Particularly contemplated agents for use in the present invention are sodium hypochlorite, ammonium dichromate, potassium permanganate and hydrogen peroxide as well as sodium chlorate. These materials readily remove the organic species from organic cation-containing molecular sieves and render the so treated molecular sieve particularly susceptible to subsequent ion exchange, e.g. ammonium ion exchange. When calcined, such ammonium exchanged-oxidation agent treated molecular sieve exhibits improved catalytic activity.

Organic cations which can be removed from zeolites in accordance with the present process include alkyl, aryl and mixed aryl-alkyl quaternary ammonium cations. Included are: tetramethylammonium, $NH_3(CH_3)^+$, $$NH_2(CH_3)_2^+$$

and $NH(CH_3)_3^+$, cations having the following formula:

$$N(R)_nH_{(y-n)}$$

wherein $n$ is an integer from 0 to 4 and $y$ is 4 and R is an alkyl or aryl group. The alkyl group may have between 1 and 5 carbon atoms in the chain. Phenyl is representative of an aryl group. Additionally, organic cations contained in a zeolite which can be removed include those having the formula:

$$R-\underset{\underset{R}{|}}{\overset{\overset{R}{|}}{X}}-R \text{ or } R_4X$$

wherein X is an element of Group V–A of the Periodic Table having an atomic number greater than 7 and R is hydrogen, an alkyl group having between 1 and 5 carbon atoms in the chain or an aryl group. X can be phosphorus, arsenic or antimony. Crystalline zeolites form a reaction mixture containing an oxide of 1,4 - dimethyl-1,4-diazoniabicyclo[2,2,2] octane can be treated, pursuant to the present invention, with the specified oxidizing agents to remove the organic cation in the molecular sieve. Additionally, zeolites which contain the cation guanidine can be treated with the oxidizing agents employed to facilitate removal of the guanidine cation to, thereby, render the zeolite more susceptible to subsequent ion exchange treatment.

Zeolites which can be particularly benefited in accordance with the present process include zeolite beta, described in U.S. 3,308,069, a form of mordenite in which a portion of the cations are tetraalkylammonium, especially tetraethylammonium, as disclosed in copending application Ser. No. 130,442, filed Apr. 1, 1971, which is a continuation of application Ser. No. 795,694, filed Jan. 31, 1969; ZSM–5 described in copending application Ser. No. 865,472, filed Oct. 10, 1969, now U.S. 3,702,886; ZSM–8 described in copending application Ser. No. 865,418, filed Oct. 10, 1969; ZSM–11 described in copending application Ser. No. 31,421, filed Apr. 23, 1970; ZSM–12 which is described in copending application Ser. No. 125,749 filed Mar. 18, 1971; tetramethylammonium offretite described in U.S. 3,578,398; ZSM–4 described in U.S. 3,578,723; ZK–5 described in U.S. 3,247,195; ZK–4 described in U.S. 3,140,252 and a form of erionite synthesized with the organic cation, benzyltrimethylammonium in the structure disclosed in copending application Ser. No. 867,063, filed Oct. 16, 1969, now U.S. 3,699,139.

ZSM–5 compositions can also be identified, in terms of mole ratios of oxides, as follows:

$$0.9 \pm 0.2 \frac{M_2O}{n} : W_2O_3 > 5 \text{ } YO_2 : zH_2O$$

and more particularly as:

$$0.9 \pm 0.2 \frac{M_2O}{n} : W_2O_3 : 5-100 \text{ } YO_2 : zH_2O$$

wherein M is a cation, $n$ is the valence of said cation, W is selected from the group consisting of aluminum and gallium, Y is selected from the group consisting of silicon and germanium, and $z$ is from 0 to 40. In a preferred synthesized form, the zeolite has a formula, in terms of mole ratios of oxides, as follows:

$$0.9 \pm 0.2 \frac{M_2O}{n} : Al_2O_3 : 5-100 \text{ } SiO_2 : zH_2O$$

and M is selected from the group consisting of a mixture of alkali metal cations, especially sodium and tetraalkylammonium cations, the alkyl groups of which preferably contain 2–5 carbon atoms.

Members of the family of ZSM–5 zeolites possess a definite distinguishing crystalline structure whose X-ray diffraction pattern shows the following significant lines:

TABLE 1

| Interplanar spacing, $d(A)$. | Relative intensity |
|---|---|
| 11.1±0.3 | s |
| 10.0±0.3 | s |
| 7.4±0.2 | w |
| 7.1±0.2 | w |
| 6.3±0.2 | w |
| 6.04±0.2 | w |
| 5.56±0.1 | w |
| 5.01±0.1 | w |
| 4.60±0.08 | w |
| 4.25±0.08 | w |
| 3.85±0.07 | vs |
| 3.71±0.05 | s |
| 3.04±0.03 | w |
| 2.99±0.02 | w |
| 2.94±0.02 | w |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$; where $I_o$ is the intensity of the strongest line or peak, and $d$ (obs.), the interplanar spacing in A, corresponding to the recorded lines, were calculated. In Table 1, the relative intensities are given in terms of the symbols $s$=strong, $m$=medium, $ms$=medium strong, $mw$=medium weak and $vs$=very strong.

Zeolite ZSM–5 can be suitably prepared by preparing a solution containing tetrapropyl ammonium hydroxide, sodium oxide, an oxide of aluminum or gallium, an oxide of silicon or germanium, and water and having a composition, in terms of mole ratios of oxides, falling within the following ranges:

| | Broad | Preferred | Particularly preferred |
|---|---|---|---|
| $OH^-/YO_2$ | 0.07–10.0 | 0.1–0.8 | 0.2–0.75 |
| $R_4N^+/(R_4N^++Na^+)$ | 0.2–0.95 | 0.3–0.9 | 0.4–0.9 |
| $H_2O/OH^-$ | 10–300 | 10–300 | 10–300 |
| $YO_2/W_2O_3$ | 5–100 | 10–60 | 10–40 | wherein R is propyl, W is aluminum or gallium and Y is silicon or germanium maintaining the mixture until crystals of the zeolite are formed. It is noted that an excess of tetrapropylammonium hydroxide can be used which would raise the value of $OH^-/YO_2$ above the ranges set forth supra. The excess hydroxdie, of course, does not participate in the reaction. Thereafter, the crystals are separated from the liquid and recovered. Typical reaction conditions consist of heating the foregoing reaction mixture to a temperature of from about 100° C. to 175° C. for a period of time of from about six hours to 60 days. A more preferred temperature range is from about 150 to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

ZSM-8 has the characteristic X-ray diffraction pattern set forth in Table 2, hereinbelow. ZSM-8 can also be identified, in terms of mole ratios of oxides, as follows:

$$0.9 \pm 0.2 \; \frac{M_2O}{n} : Al_2O_3 : 5\text{--}100 \; SiO_2 : zH_2O$$

wherein M is at least one cation, $n$ is the valence thereof and $z$ is from 0 to 40. In a preferred synthesized form, the zeolite has a formula, in terms of mole ratios of oxides, as follows:

$$0.9 \pm 0.2 \; \frac{M_2O}{n} : Al_2O_3 : 10\text{--}60 \; SiO_2 : zH_2O$$

and M is selected from the group consisting of a mixture of alkali metal cations, especially sodium, and tetraethylammonium cations.

ZSM-8 possesses a definite distinguishing crystalline structure having substantially the X-ray diffraction pattern of Table 2. The exact position of the lines and their relative intensities may vary slightly as a result of the particular ion exchange and thermal treatment effected. The most important characterizing lines are those of Table 2A.

TABLE 2

| d A. | I/I₀ | d A. | I/I₀ |
|---|---|---|---|
| 11.1 | 46 | 3.04 | 10 |
| 10.0 | 42 | 2.99 | 6 |
| 9.7 | 10 | 2.97 | 4 |
| 9.0 | 6 | 2.94 | 3 |
| 7.42 | 10 | 2.86 | 2 |
| 7.06 | 7 | 2.78 | 1 |
| 6.69 | 5 | 2.73 | 4 |
| 6.35 | 12 | 2.68 | 1 |
| 6.04 | 6 | 2.61 | 3 |
| 5.97 | 12 | 2.57 | 1 |
| 5.69 | 9 | 2.55 | 1 |
| 5.56 | 13 | 2.51 | 1 |
| 5.36 | 3 | 2.49 | 6 |
| 5.12 | 4 | 2.45 | 1 |
| 5.01 | 7 | 2.47 | 2 |
| 4.60 | 7 | 2.39 | 3 |
| 4.45 | 3 | 2.35 | 1 |
| 4.35 | 7 | 2.32 | 1 |
| 4.25 | 18 | 2.28 | 1 |
| 4.07 | 20 | 2.23 | 1 |
| 4.00 | 10 | 2.20 | 1 |
| 3.85 | 100 | 2.17 | 1 |
| 3.82 | 57 | 2.12 | 1 |
| 3.75 | 25 | 2.11 | 1 |
| 3.71 | 30 | 2.08 | 1 |
| 3.64 | 26 | 2.06 | 1 |
| 3.59 | 2 | 2.01 | 6 |
| 3.47 | 6 | 1.99 | 6 |
| 3.43 | 9 | 1.95 | 2 |
| 3.39 | 5 | 1.91 | 2 |
| 3.34 | 18 | 1.87 | 3 |
| 3.31 | 8 | 1.84 | 1 |
| 3.24 | 4 | 1.82 | 2 |
| 3.13 | 3 | | |

TABLE 2A

| Interplanar spacing, $d(A°)$: | Relative[1] intensity $(I/I_0)$ |
|---|---|
| 11.1 ± 0.2 | S |
| 10.0 ± 0.2 | S |
| 7.4 ± 0.15 | W |
| 7.1 ± 0.15 | W |
| 6.4 ± 0.1 | W |
| 6.02 } ± 0.1 | W |
| 5.98 | |
| 5.57 ± 0.1 | W |
| 5.01 ± 0.1 | W |
| 4.26 ± 0.08 | M |
| 4.08 ± 0.08 | M |
| 3.85 ± 0.07 | VS |
| 3.71 ± 0.05 | M |
| 3.47 ± 0.04 | W |
| 3.05 ± 0.03 | W |

[1] VS=very strong, S=strong, M=medium and W=weak.

In general, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range:

$SiO_2/Al_2O_3$ of from about 10 to about 200

$Na_2O$/tetraethylammonium hydroxide of from about 0.05 to 0.20

Tetraethylammonium hydroxide/$SiO_2$ of from about 0.08 to 1.0

$H_2O$/tetraethylammonium hydroxide of from about 80 to about 200

Thereafter, the crystals are separated from the liquid and recovered. Typical reaction conditions consist of heating the foregoing reaction mixture to a temperature of from about 300° F. to 400° F. for a period of time of from about six hours to 60 days. A more preferred temperature range is from about 340° to 370° F. with the amount of time at a temperature in such range being from about 12 hours to 8 days. The digestion of the gel particles is carried out until crystals form. The solid product is separated from the reaction medium, as by cooling the whole to room temperature, filtering, and water washing.

ZSM-11 can be identified, in terms of mole ratios of oxides, as follows:

$$0.9 \pm 0.3 \; \frac{M_2O}{n} : W_2O_3 : 20 \text{ to } 90 \; YO_2 : zH_2O$$

wherein M is a cation, $n$ is the valence of said cation, W is selected from the group consisting of aluminum and gallium, Y selected from the group consisting of silicon and germanium and $z$ is from 6 to 12. The zeolite has the X-ray diffraction pattern hereinafter set forth in Table 3. In the as synthesized form, the zeolite has a formula, in terms of mole ratios of oxides, as follows:

$$0.9 \pm 0.3 \; \frac{M_2O}{n} : W_2O_3 : 20 \text{ to } 90 \; YO_2 : zH_2O$$

wherein M is a mixture of at least one of the quaternary cations of a group VA element of the Periodic Table and alkali metal cations, especially sodium. The original cations can be present so that the amount of quaternary metal cations is between 10 and 90 percent of the total amount of the original cations. Thus, the zeolite can be expressed by the following formula, in terms of mole ratios of oxides, as follows:

$$0.9 \pm 0.3 \left[ xR_4 + 1-x \; \frac{M_2O}{n} \right] : W_2O_3 : 20 \text{ to } 90 \; YO_2 : zH_2O$$

wherein W and Y have the previously assigned significance, R is an alkyl or aryl group having between 1 and 7 carbon atoms, M is an alkali metal cation, X is a group VA element, especially a metal, and X is between 0.1 and 0.9.

The X-ray diffraction pattern of ZSM-11 is as follows:

TABLE 3

| Interplanar spacing, $d$(A°): | Relative intensity |
|---|---|
| 11.2±.2 | m |
| 10.1±.2 | m |
| 6.73±.2 | w |
| 5.75±.1 | w |
| 5.61±.1 | w |
| 5.03±.1 | w |
| 4.62±.1 | w |
| 4.39±.08 | w |
| 3.86±.07 | vs |
| 3.73±.07 | m |
| 3.49±.07 | w |
| 3.07⎫ ±.05<br>3.00⎭ | w |
| 2.01±.02 | w |

The parenthesis around lines 3.07 and 3.00 indicate that they are separate and distinct lines, but are often superimposed. These values were determined by standard techniques.

ZSM-11 is similar to ZSM-5 and ZSM-8 with the notable exception that whereas the ZSM-5 and ZSM-8 zeolites contain a doublet at about 10.1, 3.73, 3.00 and 2.01, A, interplaning spacing, ZSM-11 shows a singlet at these values. This means that the crystal class of the ZSM-11 is different from that of the other zeolites. ZSM-11 is tetragonal, whereas ZSM-5 and ZSM-8 tend to be orthorhombic.

ZSM-11 can be suitably prepared by preparing a solution containing $(R_4X)_2O$, sodium oxide, an oxide of aluminum or gallium, an oxide of silicon or germanium and water and having a composition, in terms of mole ratios of oxides, falling within the following ranges:

| | Broad | Preferred |
|---|---|---|
| $YO_2/WO_2$ | 10–150 | 20–90 |
| $Na_2O/YO_2$ | .05–0.7 | 0.05–0.40 |
| $(R_4X)_2O/YO_2$ | 0.02–0.20 | 0.02–0.15 |
| $H_2O/Na_2O$ | 50–800 | 100–600 | wherein $R_4X$ is a cation of a quaternary compound of an element of Group V–A of the Periodic Table, W is aluminum or gallium and Y is silicon or germanium maintaining the mixture until crystals of the zeolite are formed. Preferably, crystallization is performed under pressure in an autoclave or static bomb reactor. The temperature ranges approximately from 100° C. to 200° C. generally, but at lower temperatures, e.g. about 100° C., crystallization time is longer. Thereafter, the crystals are separated from the liquid and recovered. The zeolite is preferably formed in an aluminosilicate form. The composition can be prepared utilizing materials which supply the appropriate oxide. Such compositions include for an aluminosilicate, sodium aluminate, sodium silicate, silica hydrosol, silica gel, silicic acid and sodium hyroxide. The quaternary compounds can be any element of group VA such as nitrogen, phosphorus, antimony or bismuth. The compound is generally expressed by the following formula:

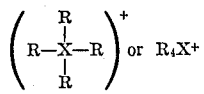

wherein X is an element of Group V–A of the Periodic Table and each R is an alkyl or aryl group having between 1 and 7 carbon atoms. While normally each alkyl or aryl group will be the same, it is not necessary that each group be either alkyl or aryl or have the same number of carbon atoms in the chain.

ZSM-12 compositions can be identified in terms of mole ratios of oxides as follows:

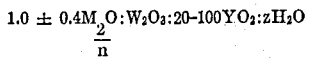

wherein M is a cation, $n$ is the valence of said cation, W is selected from the group consisting of aluminum and gallium, Y is selected from the group consisting of silicon and germanium and $z$ is from 0 to 60. In a preferred synthesized form, M is selected from the group consisting of a mixture of alkali metal cations, especially sodium, and tetraalkylammonium cations, the alkyl groups preferably containing 2 to 5 carbon atoms. Alternatively, the reaction mixture obtained from the mixing of an alkylamine and a n-alkyl halide or sulfate or other alkylating agent can be used in place of the tetraethylammonium cations.

ZSM-12 zeolites possess a definite distinguishing crystalline structure whose X-ray diffraction pattern shows the following significant lines:

TABLE 4

| Interplanar spacings, $d$(A°): | Relative intensity |
|---|---|
| 11.0±0.2 | m |
| 10.1±0.2 | m |
| 4.76±0.1 | w |
| 4.29±0.08 | vs |
| 3.98±0.08 | m |
| 3.87±0.07 | vs |
| 3.49±0.07 | w |
| 3.38±0.07 | m |
| 3.20±0.06 | w |
| 3.05±0.05 | w |
| 2.54±0.03 | w |

These values were determined by standard techniques.

The X-ray diffraction pattern of ZSM-12 can be indexed in the monoclinic system with lattice parameters having the following values:

$a_0$=12.6±.2A.
$b_0$=11.1±.2A.
$c_0$=24.4±.4A.

Zeolite ZSM-12 can be suitably prepared by preparing a solution containing tetraethylammonium cations, sodium oxide, an oxide of aluminum or gallium, an oxide of silicon or germanium, and water and having a composition, in terms of mole ratios of oxides, falling within the following ranges:

| | Broad | Preferred | Particularly preferred |
|---|---|---|---|
| $OH^-/YO_2$ | 0.10–0.40 | 0.15–0.25 | 0.17–0.20 |
| $R_4N^+/(R_4N^++Na^+)$ | 0.2–0.95 | 0.28–0.90 | 0.3–0.5 |
| $H_2O/OH^-$ | 20–300 | 50–100 | 80–100 |
| $YO_2/W_2O_3$ | 40–200 | 85–125 | 90–100 | wherein R is ethyl, W is aluminum or gallium and Y is silicon or germanium maintaining the mixture until crystals of the zeolite are formed. Thereafter, the crystals are separated from the liquid and recovered. Typical reaction conditions consist of heating the foregoing reaction mixture to a temperature of from about 80° C. to 180° C. for a period of time of from about six hours to 150 days. A more preferred temperature range is from about 150° C. to 170° C. with the amount of time at a temperature in such range being from about 5 days to 12 days.

A synthetic mordenite containing tetraalkylammonium cation can be prepared from a mixture comprising the oxides of silicon, aluminum, sodium and tetralkylammonium. The composition of the mixture of oxides is defined by the following ranges of mole ratios:

|  | Broad | Preferred |
|---|---|---|
| $R_4N^+/R_4N^++Na^+$ | 0.2-0.7 | 0.25-0.5 |
| $OH^-/SiO_2$ | 0.1-0.5 | 0.2-0.4 |
| $SiO_2/Al_2O_3$ | 10-180 | 20-100 |
| $H_2O/OH^-$ | 10-150 | 10-75 | wherein R is alkyl. The mixture is stirred until a homogeneous mass is obtained and the mass is heated at a temperature up to, but below, the boiling temperature of the mixture until crystals of the aluminosilicate are obtained. When crystals are obtained, they are filtered from the supernatant solution, washed and dried. Generally, the mixture is maintained at a temperature of at least about 200 up to 400° F. during crystallization. Preferably, the quaternary ammonium compound is a salt of the tetraethylammonium cation. The product has the formula:

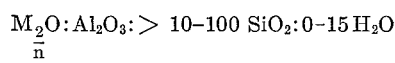

$$\frac{M_2O}{n}:Al_2O_3: > 10\text{-}100\ SiO_2:0\text{-}15\ H_2O$$

After the above-described organic cation-containing wherein M is a mixture of cations, at least one of which is tetraalkylammonium and $n$ is the valence of M. molecular sieve is prepared, it is treated as specified above, i.e. ion exchanged. Ion exchange can be accomplished in the usual manner employing, for example, a solution of a compound of a metal of Group I to Group VIII of the Periodic Table. As known, particular metals that are desirable for ion exchange into the molecular sieve include the rare earth metals, magnesium, zinc, nickel, calcium, chromium and copper. Additionally or alternatively, the molecular sieve can be ion exchanged with an ammonium or other hydrogen ion precursor to have at least a portion of the cationic sites occupied by hydrogen. Exchanges in this manner can be accomplished in accordance with the known procedures. Competitive exchanges wherein an ammonium salt, for instance, is in admixture with a rare earth salt in solution are also contemplated. Ion exchange whereby the alkali metal content is reduced to below 70 percent of exchangeable cationic sites accomplishes a dramatic increase in the catalytic activity of the molecular sieve. When so exchanged and activated by a calcination to drive off adsorbed water, the molecular sieve is useful in a wide variety of catalytic reactions.

The so treated molecular sieve is useful as a catalyst in numerous acid catalyzed reactions. For instance, the catalyst is useful in alkylation, for example, alkylation of benzene with ethylene; isomerization of aliphatic compounds such as normal pentane; isomerization of alkyl aromatic compounds such as xylene; polymerization of organic compounds such as ethylenically unsaturated compounds; disproportionation of alkyl aromatic compounds such as disproportionation of toluene to yield benzene and xylenes; dealkylation of alkyl aromatics such as dealkylation of toluene; disproportionation of aliphatic compounds such as disproportionation of normal pentane to provide butane and hexanes; oxidation especially in a copper oxide form; reforming and dehydration.

The molecular sieve component can be combined with a hydrogenation component to provide a dual functional catalyst. Employing the molecular sieve so treated containing a hydrogenation component, heavy petroleum residual stock, cycle stocks, and other hydrocrackable charge stocks can be hydrocracked at temperatures between 400° F. and 825° F. using molar ratios of hydrogen to hydrocarbon charge in the range between 2 to 80. The pressure employed will vary between 10 and 2500 p.s.i.g. and the liquid hourly space velocity will be between 0.1 and 10.

Molecular sieves treated in accordance with the process of this invention can be employed for catalytic cracking employing a hydrocarbon that is cracked at a liquid hourly space velocity between about 0.5 and 15 and a temperature between 550° F. and 1100° F. under a pressure varying between subatmospheric and several hundred atmospheres.

Employing a catalytically active form of the so treated organic cation-containing molecular sieve in combination with a hydrogenation component, reforming stocks can be reformed employing a temperature between 700° F. and 1000° F. The pressure can be between 100 and 1000 p.s.i.g. and is preferably between 200 and 700 p.s.i.g. The liquid hourly space velocity is generally between 0.1 and 10, preferably between 0.5 and 4 and the hydrogen to hydrocarbon mole ratio is generally between 1 and 20, preferably between 4 and 12.

Forms of the molecular sieve containing a hydrogenation component can be utilized for hydroisomerization of normal paraffins. Hydroisomerization is carried out at a temperature between 200 and 700° F. preferably 300 to 550° F. at a liquid hourly space velocity between 0.01 and 2 preferably between 0.25 and 0.50 employing hydrogen such that the hydrogen to hydrocarbon mole ratio is between 1:1 and 5:1. Additionally, molecular sieves originally containing an organic cation and treated in accordance with the above method can be employed for olefin isomerization employing temperatures between 30° F. and 500° F.

Particularly contemplated is the utilization of the so treated organic cation-containing molecular sieves in hydrodewaxing reactions wherein a mixture of normal paraffins and isoparaffins, naphthenes and aromatics are passed over the molecular sieve and the normal paraffins and some of the isoparaffins are shape selectively cracked to provide a liquid effluent having a low percentage of n-paraffins therein and characterized by lower pour point. This dewaxing can be done under conditions including the presence of hydrogen especially when the catalyst is in association with a hydrogenation component.

In order to more fully illustrate the nature of the invention and the manner of practicing the same, the following examples are presented. In such examples, there is set forth a particular method for preparing zeolites, such as ZSM-5, ZSM-8, ZSM-11 and ZSM-12 as well as a form of mordenite synthesized with a tetraalkylammonium cation in the structure.

EXAMPLE 1

This example illustrates the preparation of zeolite ZSM-5. 22.9 grams $SiO_2$ was partially dissolved in 100 ml. 2.18 N tetrapropylammonium hydroxide by heating to a temperature of about 100° C. There was then added a mixture of 3.19 grams $NaAlO_2$ (comp.: 42.0 wt. percent $Al_2O_3$, 30.9 wt. percent $Na_2O$, 27.1 wt. percent $H_2O$) dissolved in 53.8 ml. $H_2O$. The resultant mixture had the following composition: 0.382 mole $SiO_2$, 0.0131 mole $Al_2O_3$, 0.0159 mole $Na_2O$, 0.118 mole.

$[(CH_3CH_2CH_2)_4N]_2O$, 6.30 moles $H_2O$. The mixture was placed in a Pyrex lined autoclave and heated 150° C. for six days. The resultant solid product was cooled to room temperature, removed, filtered, washed with 1 liter $H_2O$ and dried at 230° F. A portion of this product was subjected to X-ray analysis and identified as ZSM-5. A portion of the product was calcined at 1000° F. in air for 16 hours and the following analyses were obtained:

| | Wt. percent | | Wt. percent |
|---|---|---|---|
| $SiO_2$ | 93.62 | n-Hexane adsorbed | 10.87 |
| $Al_2O_3$ | 4.90 | Cyclohexane adsorbed | 3.60 |
| $Na_2O$ | 1.48 | $H_2O$ adsorbed | 9.15 |
| Total | 100.00 | | |
| $SiO_2/Al_2O_3$ | 32.5 | | |
| $Na_2O/Al_2O_3$ | 0.5 | | |

EXAMPLE 2

A solution composed of 42.2 pounds of Q-brand sodium silicate and 52.8 pounds of water was continuously mixed with a second solution containing 1.44 pounds of $Al_2(SO_4)_3 \cdot XH_2O$ (16.7% $Al_2O_3$), 3.52 pounds of $H_2SO_4$, 15.8 pounds of NaCl and 72.2 pounds of water in a mixing nozzle. The resulting gelatinous precipitate was discharged from the nozzle into an agitated 30 gallon stainless steel autoclave. After the gel had been charged to the autoclave, it was thoroughly whipped and then 2.84 pounds of tri-n-propylamine and 2.44 pounds of n-propyl bromide were added. The autoclave was then sealed and heated to 320° F. The reaction mixture was agitated throughout the heat up and hold periof at 76 r.p.m. using a paddle type agitator. At the end of 11 hours crystallization at 320° F., the autoclave was sampled and the product was found to be 100% ZSM-5. Chemical analysis of the product showed $SiO_2/Al_2O_3$ of 70.7.

EXAMPLE 3

A solution containing 42.2 pounds of Q-brand sodium silicate and 52.8 pounds of water was continuously mixed with a second solution composed of 1.35 pounds of $$Al_2(SO_4)_3 \cdot XH_2O$$

(16.7% $Al_2O_3$), 3.52 pounds of $H_2SO_4$, 15.8 pounds of NaCl, and 72.2 pounds of water in a mixing nozzle. The resulting gelatinous precipitate was discharged from the nozzle into an agitated 30 gallon stainless steel autoclave. After the gel had been charged to the autoclave, it was thoroughly whipped and then 2.84 pounds of tri-n-propylamine and 2.44 pounds of n-propyl bromide were added. The autoclave was then sealed and heated to 320° F. and held. The reaction mixture was agitated throughout the heat up and hold period at 121 r.p.m. After 14 hours at 320° F. material sampled from the autoclave was analyzed as 100% ZSM-5. Chemical analysis of the product showed $SiO_2/Al_2O_3$ of 70.3.

EXAMPLE 4

A solution containing 50.6 pounds of Q-brand sodium silicate and 63.4 pounds of water were continuously mixed with a second solution composed of 1.62 pounds of $$Al_2(SO_4)_3 \cdot XH_2O$$

(16.7% $Al_2O_3$), 4.22 pounds of $H_2SO_4$, 18.95 pounds of NaCl and 86.4 pounds of water in a mixing nozzle. The resulting gelatinous precipitate was discharged from the nozzle into an agitated 30-gallon autoclave. After the gel had been charged to the autoclave it was thoroughly whipped and then 3.41 pounds of tri-n-propylamine, 2.93 pounds of n-propyl bromide and 5.64 pounds of methyethylketone were added. The autoclave was then sealed and heated to 250° F. and held at 250° F. for 14 hours with agitation supplied by a paddle type agitator at 76 r.p.m. The temperature was subsequently raised to 320° F. with the agitation increased to 218 r.p.m. After 6.5 hours crystallization, the product was analyzed as 100% ZSM-5. Chemical analysis of the product showed a $SiO_2/Al_2O_3$ of 73.9.

EXAMPLE 5

2.8 grams of sodium aluminate (41.8 weight percent $Al_2O_3$—31.6 weight percent $Na_2O$) were added to 30 grams of a 40-weight percent aqueous solution of tetraethylammonium hydroxide heated to about 100° F. 150 grams of colloidal silica (Ludox-containing 30 weight percent $SiO_2$) were then added and the entire mixture was subjected to mixing in a high shear mixer. This mixture was then charged to a 250 ml. Pyrex-lined autoclave and held at about 352° F. for 7 days. The autoclave was then allowed to cool to room temperature and the resulting product was separated from the reaction slurry by decantation followed by washing with water. The dried product had the X-ray pattern of ZSM-8 as specified in Table 2.

EXAMPLE 6

90 grams of commercial catalyst grade sodium silicate, one gram of commercial sodium aluminate and 168 grams of $H_2O$ were mixed in a blender. Approximately 9.9 grams of sulfuric acid (98 percent $H_2SO_4$) was added to the mixture to adjust the pH below 10. Then 11 grams of tetrabutylphosphonium chloride in 152 grams of $H_2O$ was added slowly. The mixture turned into an opaque gel. The gel was heated to 120° F. in a water bath for two hours, then in an autoclave at 300° F. for 88 hours. The product was crystalline and had the X-ray diffraction pattern of Table 3 above. Chemical analysis is as follows, in terms of mole ratios of oxides:

$Al_2O_3$ ---------------------------------------- 1.00
$SiO_2$ ----------------------------------------- 48.00
$Na_2O$ ---------------------------------------- 0.52
$(TBP)_2O$* ----------------------------------- 0.66

*Tetrabutylphosphonium cation calculated from P analysis.

EXAMPLES 7

100 grams of colloidal silica sol (30% $SiO_2$) was added to a mixture of (a) 4 grams of NaOH (97%); and
(b) 22 grams of reaction mixture obtained from the slow addition of 154 grams of diethyl sulfate to a flask containing 101 grams of triethylamine. The temperature was maintained at 104° C. until the refluxing had stopped.
(c) 1.2 grams of $NaAlO_2$ (41.8% $Al_2O_3$, 31.6% $Na_2O$).
(d) 70 grams of water.

The resulting solution had the following composition expressed in terms of mole ratios.

$RN^+/RN^+ + Na^+ = 0.43$      $H_2O/OH^- = 78$
$OH^-/SiO_2 = 0.20$            $SiO_2/Al_2O_3 = 100$

This solution was mixed for 15 minutes and then crystallized at 352° F. in a glass lined stainless steel static reactor for 12 days. The resultant solid product was cooled to room temperature, removed, filtered, washed with water and dried at 230° F. Chemical analysis of the product showed the formula to be:

$$0.89\ R_2O : 0.11\ Na_2O : Al_2O_3 : 44.8\ SiO_2$$

wherein R=organic ammonium ion.

The sorption properties of the product, calcined for 5 hours at 1000° F., were as follows:

cyclohexane—3.5 weight percent adsorbed
hexane—4.6 weight percent adsorbed
$H_2O$—4.7 weight percent adsorbed A portion of the non-calcined product was subjected to X-ray analysis and identified as ZSM-12.

EXAMPLE 8

Three solutions were prepared as follows:

Solution A:                                    Grams
  Sodium aluminate (41.8 weight percent $Al_2O_3$)
    and 31.3 weight percent $Na_2O$ ------------ 2.9
Solution B:
  Tetraethylammonium (TEA) chloride monohydrate ----------------------------------- 13.8
  Water ----------------------------------- 13.7
  Sodium hydroxide (77.5 wt. percent $Na_2O$) ----- 3.0
Solution C:
  Colloidal silica (Ludox) (30 wt. percent $SiO_2$) ---------------------------------- 72.7

Solution A was added to Solution B and the combined solutions were heated to about 100° F. Solution C was then introduced into the combined mixture of Solutions A and B and the resultant mixture was mixed for 15 minutes. The composition of the mix, Solutions A, B and C, in terms of mole ratios of oxides, was as follows:

3.15 $TEA_2O$ : 1.24 $Na_2O$ : $Al_2O_3$ : 30
$SiO_2$ : 6.30 NaCl : 3.4 $H_2O$

This was charged to an atoclave where it was maintained at a temperature of between about 330 and 340° F. and under autogenous pressure for about seven days. The crystals which crystallized from solution were washed until the filtrate showed a pH below about 11. The crystals were dried and analyzed. X-ray analysis showed the crystal structure of mordenite and that the crystallinity of the sample was very high compared to a Nova Scotia natural mordenite.

The sample was analyzed chemically and revealed the following chemical composition:

| | Weight percent |
|---|---|
| N | 0.35 |
| Na | 1.7 |
| $Al_2O_3$ | 5.1 |
| $SiO_2$ | 91.0 |

The product analysis, in terms of mole ratios of oxides, was as follows:

$$0.27\ TEA_2O : 0.74\ Na_2O : Al_2O_3 : 30.3\ SiO_2$$

The resultant crystals were determined to sorb 0.6 weight percent cyclohexane, 1.4 weight percent normal hexane and 9.1 weight percent water.

EXAMPLES 9–18

Samples of zeolite ZSM–5 containing 0.42 and 0.35 weight percent sodium, the organic species being mainly tetrapropylammonium were treated in accordance with the procedure indicated below. In each instance, an aqueous solution of the chemical was employed in the strength specified. After the ZSM–5 was treated with the designated oxidizing agent at the indicated temperature, it was given an ammonium exchange which comprised 4 one hour exchanges at 180° F. employing 10 milliliters of a one normal ammonium nitrate solution per gram of zeolite. There is set forth in Table 5 below, the amount of residual sodium in the so chemically-treated and ion-exchanged ZSM–5.

TABLE 5

Residual sodium content in chemical created and $NH_4^+$ exchanged ZSM zeolites.]

| Identification of zeolite | Chemical used [2] | Reaction [3] temp.,° F. | Reaction pressure, p.s.i.g. | Residual [4] Na, percent |
|---|---|---|---|---|
| Ex. 9, product of Ex. 3. | 5% NaOCl | ~300 | ~50 | 0.07 |
| Ex. 10, product of Ex. 3. | 25% $(NH_4)_2Cr_2O_7$ | 210 | ([5]) | 0.10 |
| Ex. 11, product of Ex. 3. | 16% $KMnO_4$ | 210 | ([5]) | 0.10 |
| Ex. 12, product of Ex. 3. | 15% $H_2O_2$ | 150 | ([5]) | 0.09 |
| Ex. 13, product of Ex. 4. | None | 180 | ([5]) | 0.17 |
| Ex. 14, product of Ex. 4. | 20% $NaClO_3$ | 400 | 155 | 0.01 |
| Ex. 15, product of Ex. 4. | 20% $NaClO_3$ | 300 | 33 | 0.07 |
| Ex. 16, product of Ex. 4. | 20% $NaClO_3$ | [6] 350 | 60 | 0.06 |
| Ex. 17, product of Ex. 4. | 20% $NaClO_3$ | [7] 350 | 55 | 0.05 |
| Ex. 18, product of Ex. 4. | 5% $NaClO_3$ | 350 | 60 | 0.06 |

[1] Standard $NH_4^+$ exchange. Four 1-hour exchanges at 180° F., 10 ml. of 1 N $NH_4NO_3$ solution per 1 g. zeolite.
[2] 4 ml. of solution to 1 gram dried zeolite.
[3] All reaction times are 16 hours, except examples 16 and 17.
[4] Sample before ion exchange containes 0.42 weight percent sodium for product of Example 3, 0.35 weight percent sodium for product of example 4.
[5] Atmos.
[6] 8 hours.
[7] 4 hours.

Pure ZSM–5 catalyst or ZSM–5 composited with alumina were treated with sodium hypochloride (5% aqueous solution of NaOCl) or sodium chlorite (20% aqueous solution of $NaClO_3$) for 16 hours at 300° F., which treatment was followed by an ammonium exchange involving four 1-hour exchanges at 180° F., 10 ml. of 1 N $NH_4NO_3$ solution per gram of zeolite. The so chemically treated-ion exchanged compositions were evaluated for their catalytic activity for upgrading octane of reformate. The evaluation was performed with an approximately 50–50 weight percent normal heptane-benzene mixture. The evaluation was performed at 600° F. under a pressure of 400 p.s.i.g. and at a 15 weight hourly space velocity. 1.5 grams of catalyst were employed and the hydrogen to hydrocarbon mole ratio was 3:1. Comparative data for the catalytic activity of the so treated catalyst are set forth in Table 6 below which also contains the values obtained employing a catalyst which was calcined instead of chemically treated. The conversion data reported in the table have been adjusted to represent the values obtained with a catalyst composition of 100 percent zeolite.

TABLE 6.—ACTIVITY OF TREATED ZEOLITE CATALYSTS

| Zeolite used | Product of Example 2 100% | Product of Example 2 65%, 35% $Al_2O_3$ | Product of Example 3 65%, 35% $Al_2O_3$ | Product of Example 3 65%, 35% $Al_2O_3$ | Product of Example 4 100% | Product of Example 4 100% |
|---|---|---|---|---|---|---|
| Treatment before $NH_4^+$ exchange | 5% NaOCl | Precalcination | 5% NaOCl | Precalcination | 20% $NaClO^3$ | Precalcination. |
| Residual Na, percent wt | 0.07 | <0.01 | 0.04 | 0.02 | 0.07 | <.01. |
| Activity test: | | | | | | |
| Condition |  600° F., 400 p.s.i.g., 15 WHSV[1] 3/1 H/HC 1.5 g. zeolite | | | | | |
| Charge stock | 50% n-heptane, 50% benzene | | | | | |
| Conversion: | | | | | | |
| n-Heptane | 84.9 | 76.8 | 69.4 | 44.1 | 70.6 | 55.0. |
| Benzene | 28.5 | 27.1 | 25.5 | 20.1 | 27.6 | 24.8. |
| $C_7^+$ aromatics | 26.3 | 26.2 | 21.9 | 12.4 | 24.4 | 21.4. |

[1] WHSV based on zeolite content.

From the data depicted in Table 6 above, it is readily apparent that a significant increase in catalytic activity is obtained accompanied by removal of the organic cation by virtue of the chemical treatment described herein. In all parallel situations, the amount of normal heptane hydrocracked was appreciable, increasing about 9 percent by weight in the first comparison, 25% in the second comparison and 28% in the third comparison. This indicates that the so treated molecular sieve is characterized by superior catalytic properties not obtained by prior art procedures directed to removing the organic species. Indeed, it is seen that calcination prior to ammonium exchange is far less efficient from a catalytic standpoint in preparing the molecular sieve for use than the herein described chemical treatment.

The oxidation potential values referred to were those described in and obtained from "Oxidation Potentials," W. M. Latimer, second edition, Pentice-Hall, 1952, and "Advanced Inorganic Chemistry," by F. A. Cotton and G. Wilkenson, Interscience Publishing, 1962.

I claim:

1. A method of removing organic species from an organic cation-containing zeolite which comprises contacting said zeolite with a solution of a compound having a standard oxidation potential of at least 0.25 volt for a period of time sufficient to effect oxidation of said organic cation.

2. A method according to claim 1 wherein the compound has an oxidation potential of between 0.5 and 2.00 volt.

3. A method according to claim 1 wherein said zeolite is contacted with said solution at a temperature between 100 and 500° F.

4. A method according to claim 1 wherein said zeolite is contacted with said solution at a temperature between 250 and 350° F.

5. A method according to claim 2 wherein the organic cation is a tetraalkylammonium cation.

6. A method according to claim 5 wherein said tetraalkylammonium cation is tetramethylammonium.

7. A method according to claim 5 wherein said tetraalkylammonium cation is tetraethylammonium.

8. A method according to claim 5 wherein said tetraalkylammonium cation is tetrapropylammonium.

9. A method according to claim 5 wherein said tetraalkylammonium cation is tetrabutylammonium.

10. A method according to claim 2 wherein said organic cation has the formula R₄X wherein X is an element of Group V-A of the Periodic Table and R is hydrogen, an alkyl group having 1 to 5 carbon atoms or an aryl group, at least one such R group being aryl or alkyl.

11. A method according to claim 10 where X is nitrogen.

12. A method according to claim 10 wherein X is phosphorus.

13. A method according to claim 1 wherein said compound is a hypochlorite.

14. A method according to claim 1 wherein said compound is a permanganate.

15. A method according to claim 1 wherein said compound is a dichromate.

16. A method according to claim 1 wherein said compound is hydrogen peroxide.

17. A method according to claim 2 wherein said compound is a chlorate.

18. A method according to claim 2 wherein said zeolite is ZSM-4.

19. A method according to claim 2 wherein said zeolite is a form of mordenite having tetraalkylammonium cations in the structure.

20. A method according to claim 2 wherein said zeolite is zeolite beta.

21. A method according to claim 2 wherein said zeolite is ZSM-5.

22. A method according to claim 2 wherein said zeolite has a composition which can be represented, in terms of mole ratios of oxides, as follows:

$$0.9 \pm 0.2 \; \frac{M_2O}{n} : Al_2O_3 : 5\text{-}100 \; SiO_2 : zH_2O$$

wherein M is a mixture of cations including at least one tetraalkylammonium cation, n is the valence of the cations, z is from 0 to 40, said zeolite having the X-ray diffraction pattern of Table 2 of th specification.

23. A method according to claim 2 wherein said zeolite has a composition which can be represented, in terms of mole ratios of oxides, as follows:

$$0.9 \pm 0.3 \; \frac{M_2O}{n} : W_2O_3 : 20 \text{ to } 90 \; YO_2 : zH_2O$$

wherein M is a mixture of at least one of the quaternary cations of a Group V-A element and alkali metal cations, n is the valence of said cations, W is aluminum or gallium, Y is silicon or germanium and z is from 6 to 12, said zeolite having the X-ray diffraction pattern of Table 3 of the specification.

24. A method according to claim 2 wherein said zeolite has a composition which can be represented, in terms of mole ratios of oxides, as follows:

$$1.0 \pm 0.4 \; \frac{M_2O}{n} : W_2O_3 : 20\text{-}100 \; YO_2 : zH_2O$$

wherein M is a mixture of alkali metal cations and tetraalkylammonium cations, the alkyl group containing between 2 and 5 carbon atoms, n is the valence of said cations, W is aluminum or gallium, Y is silicon or germanium, z is from 0 to 60, said zeolite having the X-ray diffraction pattern of Table 4 of the specification.

References Cited
UNITED STATES PATENTS

| | | | |
|---|---|---|---|
| 3,509,042 | 4/1970 | Miale | 252—455 Z |
| 3,424,696 | 1/1969 | Coingt | 252—455 Z |
| 3,498,911 | 3/1970 | Kikuchi et al. | 252—455 Z |

CARL F. DEES, Primary Examiner

UNITED STATES PATENT OFFICE
CERTIFICATE OF CORRECTION

Patent No. 3,766,093  Dated October 16, 1973

Inventor(s) POCHEN CHU

It is certified that error appears in the above-identified patent and that said Letters Patent are hereby corrected as shown below:

| | |
|---|---|
| Column 4, line 73 | "$R_4N^+/(R_4N^+Na^+)$" should be --$R_4N^+/(R_4N^++Na^+)$-- |
| Column 9, line 23 | delete "After the above-described organic cation-containing" |
| Column 9, line 25 | after "M." insert --After the above-described organic cation-containing-- |
| Column 13, line 52 (Title) | delete "Residual sodium content in chemical created and $NH_4^+$ exchanged ZSM zeolites.]" and insert therefor --Residual Sodium Content in Chemical Treated and $NH_4^+$ Exchanged(1) ZSM-5 Zeolites-- |
| Column 13, line 61 | "Ex. 13 Product of Ex. 4" should be --Ex. 13 Product of Ex. 3-- |
| Column 13, line 57 | "$(NH^4)$" should be --$(NH_4)$-- |
| Column 13, line 57 | "0.10" should be --0.12-- |
| Column 14, line 27 | "20% $NaClO^3$" should be --20% $NaClO_3$-- |

Signed and sealed this 19th day of March 1974.

(SEAL)
Attest:

EDWARD M. FLETCHER, JR.
Attesting Officer

C. MARSHALL DANN
Commissioner of Patents